May 16, 1950 — S. LIPSON — 2,507,529
APPARATUS FOR MEASURING COATING THICKNESS
Filed Feb. 6, 1945 — 3 Sheets-Sheet 1

Inventor
SAMUEL LIPSON,

Inventor
SAMUEL LIPSON

May 16, 1950     S. LIPSON     2,507,529
APPARATUS FOR MEASURING COATING THICKNESS
Filed Feb. 6, 1945     3 Sheets-Sheet 3

Inventor
SAMUEL LIPSON

Patented May 16, 1950

2,507,529

UNITED STATES PATENT OFFICE 2,507,529

APPARATUS FOR MEASURING COATING THICKNESS

Samuel Lipson, Philadelphia, Pa.

Application February 6, 1945, Serial No. 576,440

7 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to nonmagnetic (or weakly magnetic) coatings on magnetic basis metals and to magnetic coatings on non-magnetic basis materials, and it has particular reference to devices and methods for measuring the thickness of such coatings.

Broadly stated, the object of my invention is to provide improved procedure and apparatus for measuring the thickness of protective and other coatings of both the nonmagnetic and the magnetic types above mentioned.

A more specific object is to increase the accuracy and the reliability with which such measurements may be made.

Another object is to simplify the procedure of the named measurements, reduce the time and the skill required therefor, and increase the speed thereof.

A further object is to simplify the construction, lower the cost and enhance the portability of the apparatus needed to effect such measurement.

A still further object is to provide an electromagnetic type of measuring instrument which is energizable by either alternating or direct current, and which is not adversely affected by voltage variations within reasonable limits.

In practicing my invention I attain the foregoing and other objects by the aid of a novel electromagnetic instrument comprising a solenoid surrounding a soft iron core slidable with respect to a reference support along which the solenoid is free to move. With the solenoid energized and held vertically this core is drawn, by upward movement of the solenoid along the support, from contact with the coating whose thickness is to be measured. The spacing of the solenoid from the coating surface at the instant of core separation varies with the coating thickness in the distinctive way later set forth herein. Hence, by noting the solenoid position on the reference support when the core leaves the coating there is provided a highly reliable indication of the coating's thickness.

Illustrative embodiments of my improved method and apparatus are shown by the accompanying drawings wherein.

THE THICKNESS MEASURING INSTRUMENT

The thickness measuring instrument preferred for the practice of my invention is of a specially constructed electromagnetic type. In the illustrative form which Figs. 1-2 show this instrument utilizes a solenoid winding 10 having energizing leads which extend through a flexible cord 11 and terminate in a supply plug 12; a core 13 taking the form of a rod of soft iron or other magnetic material; a reference tube 14 of glass or other suitable material which surrounds the core within the solenoid and which carries scale graduations in its upper end; and an indicator 15 of nonmagnetic material attached to the upper end of the core for protrusion above the solenoid's top.

Figure 1:
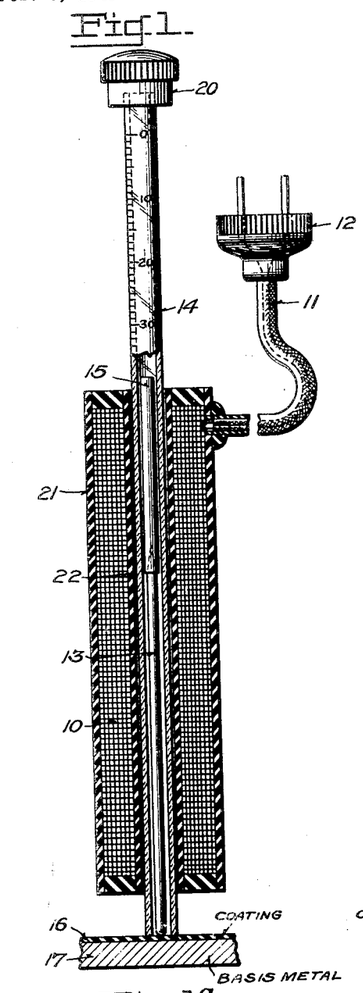
Fig. 1 is a side elevation view partly in section showing one form of instrument by which the improved method of my invention may be practiced.
Figure 1A:
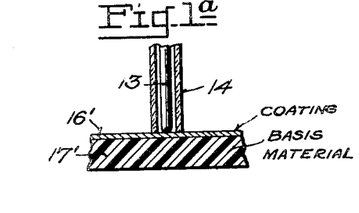
Fig. 1a shows a magnetic coating on a nonmagnetic basis material.
Figure 2:
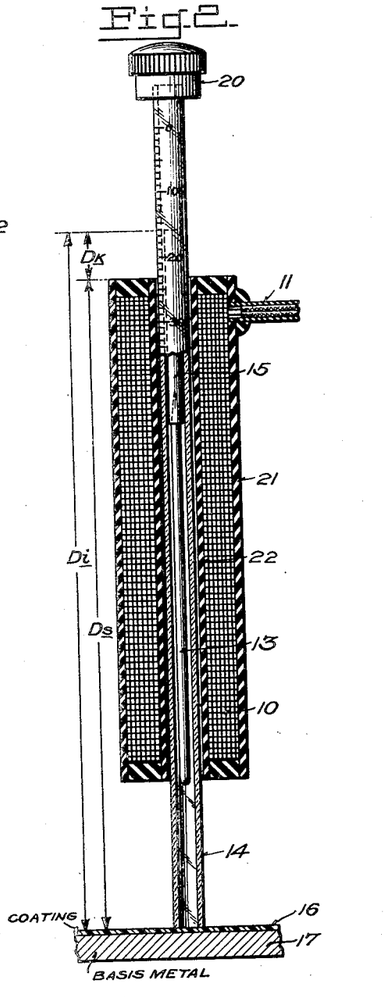
Fig. 2 is a similar view of the same instrument showing the core separated from the coating being measured for thickness.

During use this instrument is positioned with respect to the coating to be measured in the manner which Figs. 1-2 represent. In those figures a nonmagnetic coating 16 is shown as being carried on the surface of steel or other magnetic basis material 17; in Fig. 1a, however, a magnetic coating 16' is shown as being carried on the surface of nonmagnetic material 17'. As the description proceeds it will be seen that nonmagnetic coating 16 may take the form of a protective or decorative paint or varnish applied to metal objects of various thicknesses, materials and shapes; and that magnetic coating 16' may take the form of ferrous or other metal either supported against the surface of a nonmagnetic base or existing independently as a thin sheet.

In the illustrative instrument here represented the reference tube 14 has a diameter sufficiently smaller than the central opening through the solenoid as to permit free sliding of the solenoid along the tube; the soft iron core 13 and its indicator 15 are sufficiently smaller than the tube's inside diameter as to permit free axial movement within the tube; and the solenoid winding 10 is shown as being provided with outer and inner support tubes 21 and 22 of nonmagnetic material (and preferably nonconducting also, such as fiber) plus end closures which impart mechanical strength and ruggedness to the winding assembly.

Winding 10 may be designed for energization from commercial lighting circuits such as 110 volts direct or alternating current. For such voltage the current drawn by the instrument shown is exceedingly small, it being of the order of only 20 milliamperes for alternating current energization at 60 cycle per second frequency and only slightly more for direct current energization. This means a power consumption of the very low order of about 2 watts.

By design refinements not here represented even further power reductions are possible. One such refinement consists in surrounding the entire solenoid with magnetic sheeting (not shown) such as iron by which return of magnetic lines of force is aided. Optionally, of course, winding 10's requisite number of ampere turns may be gotten at lower (such as 6 volts) or higher potentials than 110 volts.

Figure 8:
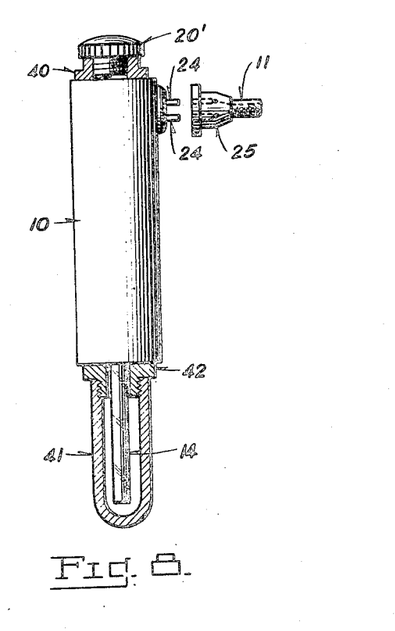
Fig. 8 illustrates mechanical refinements desirable under certain conditions.

Details incident to securing the flexible cord 11 to the solenoid casing 21 are shown only diagrammatically inasmuch as adequate means for imparting the necessary mechanical strength are well known. Optionally the leads from the winding 10 may be brought through prongs such as Fig. 8 shows at 24 which may be engaged by a removable plug of the type shown at 25 in Fig. 8.

The preferable material for the solenoid's core 13 is silicon iron of a type which retains only a minimum of residual magnetism. Such material finds extensive use in the cores of electrical transformers. The core illustratively shown at 13 is solid metal of round cross section and having a diameter of about eighty-thousandths inch. The lower end preferably is rounded as shown.

Such a hemispherical point has special advantages with alternating current energization of the instrument, and even with direct current energization it is desirable since it gives tenacity of attraction greater than does a flat or pointed core end. It also widens the tolerance of angular contact of the core with the surface of coating 16 to be measured.

In length this core 13 may satisfactorily be slightly less than that of the solenoid winding 10 by which it is surrounded. Other lengths are, however, useable, and instruments having cores the same length as or even greater than that of the solenoid are found to function in the manner intended.

The indicator 15 preferably is made of nonmagnetic material which is relatively light in weight. Fiber, plastic or other nonmagnetic substances are found to be satisfactory. Even nonmagnetic metal, such as aluminum or brass, can be used but is subject to the disadvantage of imposing an excessive weight on the magnetic core 13. In length the indicator 15 should coordinate with the scale markings on the reference tube 14 in a manner which will become further evident as the description proceeds. Attachment of the indicator to the core may be by the illustrated screw thread connection or by other expedient which results in a firm joint.

The reference tube 14 illustratively shown is made of glass through which the position of indicator 15 may visually be observed in relation to the tube's scale markings. These markings may be placed on the tube in any suitable way as by etching or other inscription. Optionally, of course, the tube 14 may be of nontransparent material and be provided with a slot (not shown) through which the top of indicator 15 may be observed in relation to scale markings.

Preferably a holding knob 20 is attached to the tube's upper end. This may be of a wide variety of shapes and materials. Its primary purpose is to aid the user in manipulating the instrument during thickness measurements. It also prevents escape of the core and indicator through the tube top during carriage of the instrument.

PRINCIPLE AND TECHNIQUE OF OPERATION

Figure 3:
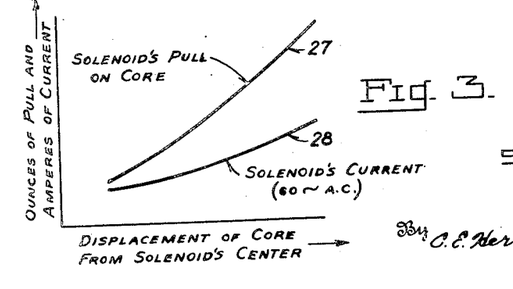
Fig. 3 diagrams certain characteristics of the instrument of Figs. 1-2 when energized by alternating current.

The principle of operation which my improved instrument utilizes may in part be explained by reference to Fig. 3. From the curves there presented it will be seen that under energized conditions of the solenoid 10 displacement of the core 13 from the solenoid's center sets up a magnetic pull on the core which builds up in the manner depicted at 27. For alternating current energization of the solenoid the current drawn by the winding also increases as shown at 28 as the core is displaced from the solenoid's center. If the energization be by direct current, the winding current of course remains constant.

Were, therefore, the instrument of Figs. 1-2 to be held horizontally, core 13 would be drawn to the center position within winding 10 and there held in a state of magnetic equilibrium. In the vertical position of Fig. 2, the core 13 drops sufficiently below that central position to build up a magnetic pull thereon which exactly equals the weight of the core plus the indicator 15. These characteristics are well known and their discovery is not claimed to have been original with me. The unique way in which these characteristics are utilized to measure the thickness of both nonmagnetic and magnetic coatings is, however, new and heretofore unknown insofar as I am now able to determine.

In using my improved instrument for thickness measurement the end of reference tube 14 is placed in contact with the surface of the coating 16 (or 16') to be measured. Such positioning is shown by each of Figs. 1, 1a and 2. The solenoid 10 is now lowered until the end of core 13 is brought into contact with the coating's surface. This position is shown by Fig. 1 and 1a. By reason of the flux passed through core 13 by the energized winding 10 that core now exhibits the properties of a magnet and as such it is attracted either to the basis metal 17 beneath the nonmagnetic coating 16 (Fig. 1) or to the magnetic coating 16' itself (Fig. 1a).

This attraction behaves in accordance with well known laws of magnetism. In Fig. 1, for example, it varies inversely with the square of the spacing which nonmagnetic coating 16 introduces between the end of core 13 and the basis metal 17 beneath the coating. When, therefore, the coating 16 of Fig. 1 is thin, the intensity of attraction is relatively high; and as the coating thickness is increased, the force attraction becomes relatively less. This phenomenon also is well known and it per se is not now claimed to have originated with me.

My contribution resides in a unique correlation of the foregoing phenomena by which it is possible to obtain an accurate indication of the force necessary to separate the magnetized core 13 from the surface of the coating 16 (or 16') being observed and to convert this force measurement into an indication of the coating's thickness. In the apparatus shown this is accomplished by observing the distance of the solenoid from the coating surface at the instant of core separation therefrom. That separation takes place when the magnetic pull of the solenoid on the core has built up sufficiently to just overcome the core's weight plus the attraction of the core for either the coating itself (Fig. 1a) or the basis metal therebeneath (Fig. 1).

In the here shown measuring instrument of my invention, this distance of solenoid spacing from the coating surface is indicated by the scale on the upper end of reference tube 14. A corresponding scale could of course be placed on the lower end of the tube. For convenience of reading the placement shown by Figs. 1-2 offers advantages.

The technique of using my instrument is exceedingly simple. With the solenoid energized, one hand of the user holds the reference tube 14 in contact with and substantially perpendicular to the surface of the coating 16 to be measured. This holding is aided by the knob 20 on the reference tube's upper end. Vertical positioning of the tube assures proper suspension of the core within the tube and relatively friction-free action of its weight.

With the other hand, the user next moves the solenoid towards the coating 16 until the end of core 13 comes into contact with that coating's surface. The solenoid is now slowly moved upwardly away from the surface in such manner that movement may be stopped and the position on the reference tube retained at any instant.

Figure 4:
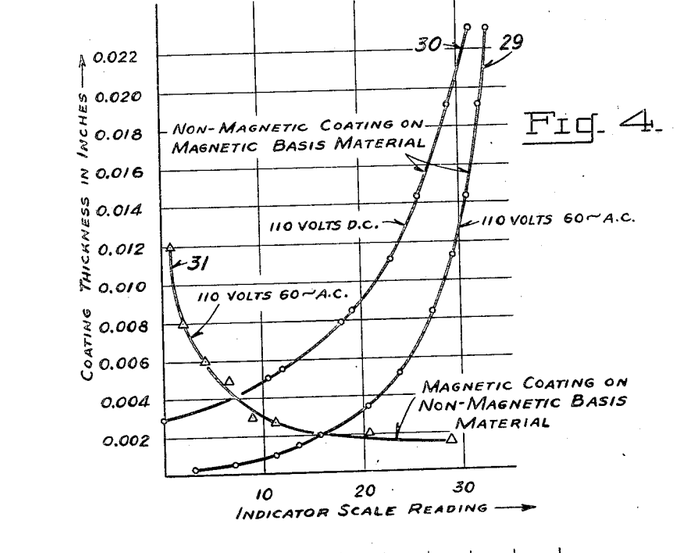
Fig. 4 presents calibration curves for the same instrument when used to measure both nonmagnetic and magnetic coatings and when energized by both alternating and direct current.

This upward movement is continued until the core is pulled away from the coating surface. When this happens solenoid movement is immediately stopped and the position along reference tube is carefully kept. A reading on the reference tube scale is now made and by the aid of calibration curves such as Fig. 4 shows, that reading is converted into a thickness measurement for the coating under observation.

NONMAGNETIC COATINGS AND A. C. ENERGIZATION

My improved instrument is useable to measure: (a) nonmagnetic coatings on magnetic basis materials; (b) weakly magnetic coatings on more strongly magnetic metals; and (c) magnetic coatings on nonmagnetic basis materials. It also may be energized by either direct or alternating current. In Fig. 4 there have been plotted three curves 29—30—31 which typify the foregoing. Curve 29 is for nonmagnetic coatings and A. C. energization. The data therefor is presented by the following Table I.

Table I.—*Nonmagnetic coating readings with A. C. voltage*

| 60 Cycle A. C. Voltage | Nonmagnetic Coating Thickness | Distances | | | Scale Reading | |
|---|---|---|---|---|---|---|
| | | $D_s$ | $D_k$ | $D_i$ | Solenoid | Indicator |
| | *Inches* | *Inches* | *Inches* | *Inches* | | |
| 110 | 0.00023 | 7.3 | 0.5 | 7.8 | 11.0 | 3.0 |
| 110 | 0.00053 | 7.1 | 0.5 | 7.6 | 14.8 | 6.8 |
| 110 | 0.00114 | 6.8 | 0.5 | 7.3 | 19.0 | 11.0 |
| 110 | 0.00154 | 6.6 | 0.5 | 7.1 | 20.3 | 14.3 |
| 110 | 0.00194 | 6.4 | 0.5 | 6.9 | 24.0 | 16.2 |
| 110 | 0.00357 | 6.2 | 0.5 | 6.7 | 29.0 | 21.0 |
| 110 | 0.00515 | 6.0 | 0.5 | 6.5 | 32.0 | 24.0 |
| 110 | 0.00825 | 5.8 | 0.5 | 6.3 | 35.0 | 27.0 |
| 110 | 0.0115 | 5.6 | 0.5 | 6.1 | 37.5 | 29.5 |
| 110 | 0.0145 | 5.5 | 0.5 | 6.0 | 39.0 | 31.0 |
| 110 | 0.0195 | 5.4 | 0.5 | 5.9 | 40.0 | 32.0 |
| 110 | 0.0253 | 5.3 | 0.5 | 5.8 | 41.5 | 33.5 |

This data applies to the instrument of Figs. 1–2 when the winding 10 thereof is energized by 60 cycle alternating current at a constant potential of 110 volts. Such energizing potential may be obtained by inserting the instrument's plug 12 into the outlet of a standard lighting circuit with which most offices, laboratories, factories and other buildings are supplied. Such a voltage is listed by the first column of Table I.

Column 2 of that table tabulates coating thicknesses of from 0.00023 inch to 0.0253 inch. The coatings listed form parts of standard samples prepared by the National Bureau of Standards in Washington, D. C., and are accepted for accuracy universally by the trade. Each of these standard samples includes a flat plate of basis metal 17 (see Figs. 1–2) in the form of mild steel, the composition of which is the same for all of the samples. Such basis material is similar to the steels used for a majority of fabricated steel articles which require protective and decorative finishes.

The samples used all had basis metal thickness of the order of about 0.040 inch. In making measurements with my improved instrument it has been discovered that as long as the basis metal thickness is over 0.015 inch variations therein have no noticeable effect on the coating thickness readings which the instrument gives. Hence the samples used can be said to typify all basis metal thicknesses greater than 0.015 inch.

These magnetic basis metal plates carried on their surfaces a coating 16 (see Figs. 1–2) of nonmagnetic material of the accurately gaged thicknesses which Table I's column 2 sets forth. In the samples used this coating was of nonmagnetic metal. For purposes of calibrating the instrument this coating is the full equivalent of all nonmagnetic metals (such as copper, cadmium, chromium, silver, gold, etc.) and of all nonmetallic finishes of the organic and other types. Included in the latter group are protective paints, varnishes, enamels, etc.

Table I's next three "Distance" columns are identified with the markings $D_s$, $D_k$, $D_i$ of Fig. 2. $D_s$ designates the spacing of the solenoid's top from the surface 16 under observation at the instant that core 13 is pulled (see Fig. 1) from the surface of the coating 16 under observation. As Table I shows, this distance is smallest for the thicker coatings and progressively increases as the coating thickness is decreased.

Fig. 2 shows $D_k$ to designate the distance by which the top of indicator 15 protrudes above the top of the solenoid after the core 13 has assumed its equilibrium position within the solenoid following separation from the nonmagnetic coating 18. For a constant value of energizing voltage (see the first column of Table I) this distance $Dk$ is the same for all readings. Under the conditions stated, therefore, Fig. 2's distance $Di$ will be greater than distance $Ds$ by a constant factor shown in Table I as 0.5 inch.

Under constant voltage conditions it is therefore optional whether the reading on the scale of reference tube 14 be made at the top of solenoid 10 ($Ds$) or at the top of indicator 15 ($Di$). The last two columns of Table I respectively set forth such readings for the twelve different coating thicknesses which that table lists. The relative merits of the solenoid and indicator readings are more fully discussed in a later section of this specification.

Calibration curve 29 of Fig. 4 shows the relation between the coating thickness values of Table I's second column and the indicator scale reading values of the same table's last column. This curve 29 is illustrative of the relatively wide range of coating thicknesses which may be measured by my improved instrument. High accuracies can be gotten from the exceedingly low thickness values shown up to well over 0.010 inch. Within this range the calibration curve 29 makes clear differentiation between differing thickness values. The upper part of the curve, however, increases in steepness and results in some sacrifice of accuracy.

In the measuring instrument illustratively shown the reference tube 14 carries a scale with uniform distance graduations. Readings obtained from this scale must of course be converted into thickness values by reference to a calibration curve of the type shown at 29 in Fig. 4. From the data here presented, however, it will be apparent that the reference scale 14 may instead be calibrated to give direct readings of coating thickness, and in that event no resort to a calibration curve need be made.

NONMAGNETIC COATINGS AND D. C. ENERGIZATION

Curve 30 of Fig. 4 applies to the illustrative instrument of Figs. 1-2 when energized by 110 volts direct current and used to measure the earlier described "standard" samples of nonmagnetic coatings on magnetic basis metals. The data therefor is set forth by the following Table II.

*Table II.—Nonmagnetic coating readings with D. C. voltage*

| D. C. Voltage | Nonmagnetic Coating Thickness | Distances | | | Scale Reading | |
|---|---|---|---|---|---|---|
| | | $Ds$ | $Dk$ | $Di$ | Solenoid | Indicator |
| | *Inches* | *Inches* | *Inches* | *Inches* | | |
| 110 | 0.00357 | 7.2 | 0.8 | 8.0 | 13.0 | 0.0 |
| 110 | 0.00515 | 6.5 | 0.8 | 7.3 | 24.0 | 11.0 |
| 110 | 0.00560 | 6.4 | 0.8 | 7.2 | 25.1 | 12.1 |
| 110 | 0.00795 | 6.1 | 0.8 | 6.9 | 31.0 | 18.0 |
| 110 | 0.00825 | 6.0 | 0.8 | 6.8 | 32.1 | 19.1 |
| 110 | 0.0115 | 5.7 | 0.8 | 6.5 | 36.5 | 23.5 |
| 110 | 0.0145 | 5.6 | 0.8 | 6.4 | 39.0 | 26.0 |
| 110 | 0.0195 | 5.4 | 0.8 | 6.2 | 41.5 | 28.5 |
| 110 | 0.0253 | 5.3 | 0.8 | 6.1 | 44.0 | 31.0 |

This direct current curve 30 has the same general shape as the alternating curve 29 but differs therefrom in accommodating minimum thicknesses of nonmagnetic coatings which start at approximately 0.00357 inch instead of at less than 0.00023 inch. As in the case of curve 29, curve 30 shows the relation between the coating thickness values of Table II's second column and the indicator scale reading values of the same table's last column.

From curves 29—30 of Fig. 4 it will be seen that the instrument of Figs. 1-2 covers a wider range of nonmagnetic coating thickness values when energized with alternating current than when energized with direct current. This particular instrument was designed primarily for alternating current use and hence cannot function with maximum effectiveness when energized by direct current. By suitable modifications of design it is, however, possible to provide a direct current instrument which also will be effective at the exceedingly low values of nonmagnetic coating thickness which curve 29 presents.

One further difference in instrument performance will be noted by comparison of Tables I and II. Under alternating current energization (Table I), the distance $Dk$ by which the core indicator 15 extends above the top of solenoid 10 has the value of 0.5 inch at 110 volts, 60 cycles. For direct current energization at 110 volts the value of $Dk$ is shown by Table II to have increased to 0.8 inch.

This increase can be explained by the fact that current passed through winding 10 from the 110 volt direct current source is somewhat larger than the current passed through that winding from the 110 volt alternating current source. This difference results from the fact that the direct current value is determined by the winding's resistance only, whereas the alternating current value is determined by the same value of resistance plus a component of inductance which combines to give an alternating current impedance somewhat larger than the direct current resistance.

MAGNETIC COATINGS AND A. C. ENERGIZATION

Curve 31 applies to the illustrative instrument of Figs. 1-2 when energized by 110 volts alternating current of 60 cycles per second frequency and used to measure the thickness of magnetic coatings on nonmagnetic basis materials (see Fig. 1a). The data therefor is set forth by the following Table III.

*Table III.—Magnetic coating readings with A. C. voltage*

| 60 Cycle A. C. Voltage | Magnetic Coating Thickness | Distances | | | Scale Reading | |
|---|---|---|---|---|---|---|
| | | $Ds$ | $Dk$ | $Di$ | Solenoid | Indicator |
| | *Inches* | *Inches* | *Inches* | *Inches* | | |
| 110 | 0.0015 | 5.5 | 0.5 | 6.0 | 37.0 | 29.0 |
| 110 | 0.0020 | 6.2 | 0.5 | 6.7 | 29.0 | 21.0 |
| 110 | 0.0025 | 6.8 | 0.5 | 7.3 | 19.0 | 11.0 |
| 110 | 0.0030 | 7.0 | 0.5 | 7.5 | 16.0 | 8.0 |
| 110 | 0.0050 | 7.1 | 0.5 | 7.6 | 14.5 | 6.5 |
| 110 | 0.0060 | 7.2 | 0.5 | 7.7 | 12.0 | 4.0 |
| 110 | 0.0080 | 7.3 | 0.5 | 7.8 | 10.0 | 2.0 |
| 110 | 0.0120 | 7.4 | 0.5 | 7.9 | 9.0 | 1.0 |

Column 2 of Table III tabulates coating thicknesses of from 0.0015″ to 0.0120″. The coatings listed took the form of steel sheets of accurately known thickness and all of the same metallurgical composition. These particular sheets typify the magnetic coating shown at 16′ in Fig. 1a. In taking the readings here recorded each sheet was held in firm contact with the top of a wooden table which typifies nonmagnetic basis material of the type shown at 17′ in Fig. 1a.

Unlike the curves 29—30 of Fig. 4 which apply to nonmagnetic coatings on magnetic basis materials, the curve 31 applicable to magnetic coatings on nonmagnetic basis materials shows increases in instrument reading with decreases in coating thickness. Explanation for this is believed to be that the thinner magnetic coatings (16' of Fig. 1a) have less body and hence offer less attractive force to the instrument's core 13 than do the thicker and heavier coatings. In any event the illustrative instrument of Figs. 1–2 performs therewith in the distinctive and highly useful manner which curve 31 (Fig. 4) typifies.

WEAKLY MAGNETIC COATINGS ON MORE STRONGLY MAGNETIC BASIS MATERIALS

By the aid of my improved instrument it is also possible to measure the thickness of weakly magnetic material on basis metals having stronger magnetic properties. Nickel deposits on steel afford one example. The nickel's magnetic characteristics are so much lower than those of the steel that my instrument continues to behave in a manner very similar to that typified by Fig. 4's curves 29—30 for non-magnetic coatings on magnetic basis materials. In view of the closeness of that similarity, further illustrative data is not here presented.

VOLTAGE CHANGE COMPENSATION

It has already been pointed out that under conditions of constant voltage energization the reading of the solenoid's position along reference tube 14 may with equal accuracy be taken either from the top of the solenoid or from the top of core indicator 15. Under such constant potential conditions the indicator extends above the solenoid by a constant distance $Dk$ (see Tables I–II–III).

When, however, the instrument energizing voltage varies in magnitude there is a decided advantage in taking the reading from the indicator 15 rather than from the top of the solenoid. Reason for this advantage will become apparent upon examination of the curve of Fig. 5. This curve has been plotted to show the effect of varying the alternating current energizing voltage (60 cycle per second frequency) from 70 volts to 150 volts when the instrument is used to measure one, and one only, thickness of nonmagnetic coating illustratively chosen from Table I as having the value of 0.00515 inch.

Figure 5:
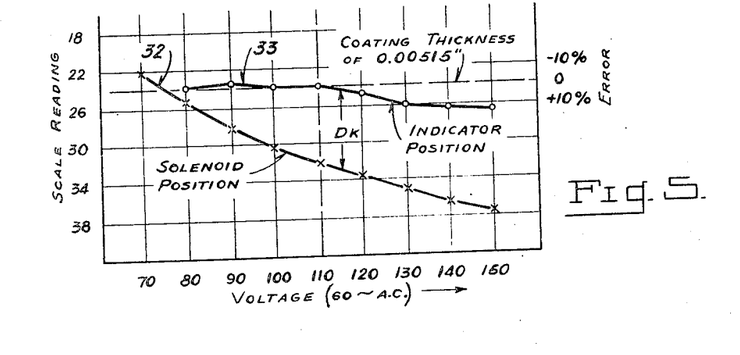
Fig. 5 indicates how the instrument automatically compensates for changes in the supply voltage.

At 110 volts Fig. 5's curve 32 shows that the top of the solenoid registers with reference tube 14's scale marking 32; curve 33 shows that the top of indicator 15 then registers with the reference tube's scale marking 24. The resulting difference of eight scale divisions conforms with the data presented by Table I for 110 volts. This corresponds to a distance value $Dk$ (see Fig. 2) of 0.5 inch.

From Fig. 5 it will be seen that as the applied voltage is decreased the solenoid position along reference tube 14's scale progressively rises in the manner which curve 32 shows, and as the instrument voltage is increased the position progressively lowers, as the same curve also shows. The phenomena here involved is believed to be something as follows.

The core 13 is attracted into the solenoid 10 more strongly as the solenoid voltage is increased and hence at higher voltages a given core pull can be built up by a smaller movement of the solenoid away from the surface under observation than is the case when the solenoid voltage is of lower value. This is clearly shown by Fig. 5's curve 32. At 70 volts the top of the solenoid must move up to reference tube 14's scale graduation 22 before core separation occurs, while at 150 volts movement to scale graduation 37 only is needed to pull core 13 away from coating 16.

It is realized, of course, that the degree of magnetization of the core also increases with rises in solenoid voltage, but this effect is in practice found to be far less than the former. Reason therefor is not definitely known, but magnetic saturation of the core material may offer one explanation. In any case, the illustrative instrument of Figs. 1–2 exhibits the solenoid position variation of Fig. 5's curve 32.

The indicator position responds to variations in solenoid voltage in the somewhat different manner which curve 33 of Fig. 5 shows. At 110 volts solenoid 10 draws core 13 to an equilibrium position (see Fig. 2) such that the top of indicator 15 protrudes above the top of the solenoid by eight scale divisions. As the solenoid voltage is decreased the magnetic field strength correspondingly drops and hence allows the core and indicator to lower their position in the solenoid; similarly, as the solenoid voltage is increased the more intensified magnetic field draws the core higher into the winding and hence causes the top of indicator 15 to protrude above the solenoid by correspondingly greater distances. Fig. 5 thus shows $Dk$ (again see Fig. 2) to have a value of about two reference tube scale divisions at 80 volts, and about 10 scale divisions at 150 volts.

This variation in indicator position as shown by curve 33 tends to neutralize the accompanying variation in solenoid position as shown by curve 32 with the result that reference scale readings obtainable from the top of indicator 15 remain substantially constant through a relatively wide range of solenoid voltage values. For, as voltage increases lower the readings obtainable from the solenoid, the accompanying greater protrusion of the indicator above the solenoid tends to compensate in such a manner that curve 33 has the relatively flat form which Fig. 5 shows.

From that curve it will be seen that voltages between 80 and 120 volts produce substantially the same reading by indicator 15, and that from 120 to 150 volts the deviation in reading is typified by only a small percentage of error. By reason of this self-compensating effect my improved instrument is capable of making accurate measurements when energized by voltages which vary as to magnitude within a relatively wide range. Energization from standard sources of lighting and power voltage is therefore practical and does not call for special regulating means which otherwise would be necessary.

REPRESENTATIVE ACCURACIES

Figure 6:
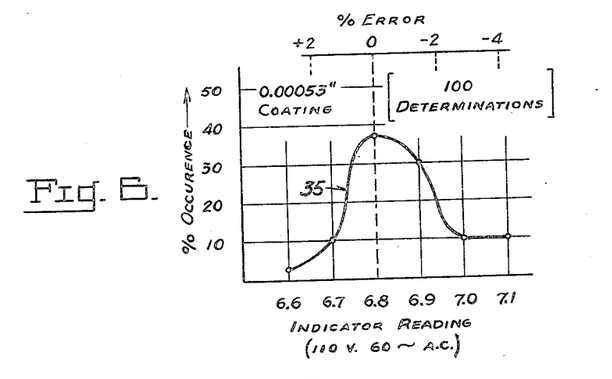
Fig. 6 depicts representative accuracies of which the Figs. 1-2 instrument is capable.

The measuring instrument of my invention is capable of exceedingly high accuracy and exhibits excellent reproducibility characteristics. These are shown by the graph of Fig. 6. This graph was obtained from an instrument of the Figs. 1–2 type supplemented by a Vernier scale (not shown) from which accurate observations to the tenth of each of reference tube 14's scale divisions could be made.

With alternating current energization of the instrument at 110 volts, 60 cycles, one hundred determinations were made of the standard coating sample of 0.00053 inch. In Table I this thickness value is identified with the data of line 2 and produces an indicator scale reading of 6.8. Of the 100 test determinations thus made, 38 were found to repeat themselves exactly on the 6.8 scale reading; 30 repeated themselves on a reading of 6.9; 10 on a reading of 7.0; 10 on a reading of 7.1; 10 on a reading of 6.7; and 2 on a reading of 6.6.

When plotted this data produces the curve 35 of Fig. 6 by which the high reproducibility of my instrument's readings is typified. The maximum reading error was only 4%, and the majority of the readings fell within far close error limits.

EFFECT OF OTHER FACTORS

Certain other factors have some slight effect upon accuracy of measurement determinations. One of these is heating of the solenoid winding 10. This naturally depends on the winding's design, gage of wire, impressed voltage, etc. The illustrative instrument of Figs. 1–2 showed only a small error attributable to changes in solenoid temperature from room value to its steady-state operating value.

Starting with the winding cold, such operating temperature was attained after about 20 minutes of continuous energization. Such a relatively long time is typical of the comparatively small rise in temperature which the solenoid experiences. Such rise in temperature was, moreover, found to be accompanied by a scale reading variation of not more than 2%. This of course is so small as to make reliable measurement possible at any point in the heating cycle and does not require any pre-warming of the instrument.

Another factor meriting mention is variations in thickness of the magnetic basis metal 17 (Figs. 1–2) by which the nonmagnetic coating 16 under observation is carried. As earlier pointed out, experience with my improved gaging device shows that where basis metal thicknesses exceeds 0.015 inch, variations therein have practically no effect on accuracy of coating thickness measurement. This means that as long as the basis metal has a thickness of 0.015 inch or greater, the absolute value thereof may be disregarded.

Composition of the basis metal also is a factor for consideration along with its heat treatment and structure. However, since an overwhelming proportion of finished steel articles are fabricated from mild steels, one calibration for this material will be found to satisfy most needs. If the basis metal should be of radically different nature, a separate calibration is of course necessary.

Sensitivity to vibration and shock though not measured quantitatively has been found to be quite low. Variation in vertical alignment of the instrument within reasonable limits has likewise been found to exert a negligible influence on the reproducibility obtained.

Although vertical positioning of the instrument during operation is desirable, it is also possible to obtain indications of coating thickness with the instrument held horizontally. This does not permit use of the voltage compensating feature; however, by "horizontal" calibration of the instrument before each test, reliable thickness determinations of vertically positioned coatings may be made.

OPTIONAL CONSTRUCTIONS

With only a little practice the user can become sufficiently schooled in manipulating the instrument of Figs. 1–2 as to attain highly accurate thickness readings without the aid of mechanical or other special means for slowly elevating the solenoid from the coating being observed until the core 13 separates itself from the surface thereof. Just before such separation is effected a chattering of the core (under alternating current energization) warns the user to proceed slowly from this point. The discontinuance of the chatter plus the appearance of the indicator above the solenoid's top signifies the "end" point which marks the position of instrument reading.

Figure 7:
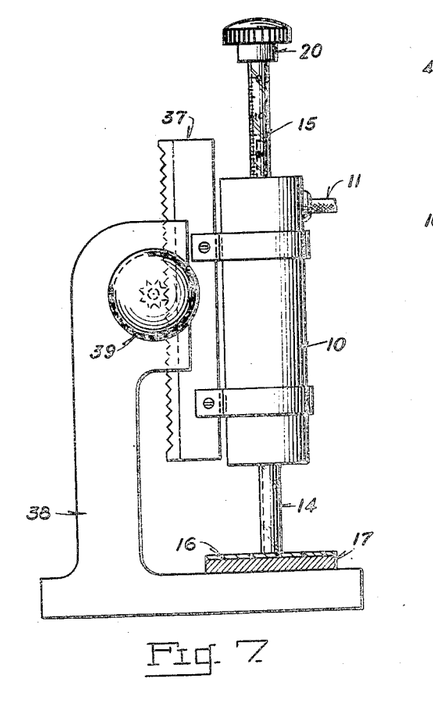
Fig. 7 shows the instrument supported in a mounting by which its position may be mechanically adjusted.

In certain instances, however, it may be desirable to equip the instrument with a mechanical type of elevating mechanism such as Fig. 7 shows. There the solenoid 10 is clamped to the rack 37 of a mount 38 which includes an elevating knob 39 arranged in conventional manner to raise or lower the instrument with respect to the coating specimen 16—17 supported therebeneath on the mount's horizontal platform.

Technique of the instrument's use remains the same as before with the exception that adjustment of knob 39 is substituted for a manual sliding of solenoid 10 upwardly along the reference tube 14. Moreover, when core separation has been effected the mount of Fig. 7 serves to retain the particular position at which such separation occurred. In some instances this may facilitate observation of the scale reading.

One important feature of my improved instrument is its portability. In Fig. 8 I have shown certain ways in which the reference tube 14 may be protected against accidental damage during carriage of the instrument. The detachable plug 25 has already been mentioned as permitting the flexible supply cord 11 to be carried separately from the solenoid, reference tube, core and indicator.

Protection of the reference tube 14 may be enhanced by equipping the upper knob 20' thereof with threads which may be screwed into a mating fitting 40 to lock the reference tube at its extreme downward limit of travel through the solenoid. For protecting the exposed lower end thereof from mechanical damage, use may be made of a guard cap 41 which fits thereover and is securely held in place by a screw engaging with a thread fitting 42 fixed to the solenoid's lower end.

SUMMARY

The improvements in my invention are characterized by high utility and broad application. Through a practice of the method and by means of the apparatus here disclosed there may be made accurate, convenient and reliable thickness measurements of: (a) nonmagnetic coatings on magnetic basis materials; (b) weakly magnetic coatings on more strongly magnetic metals; and (c) magnetic coatings on nonmagnetic basis materials.

Illustrative examples of the high degree of accuracy have already been described by reference to the curves of Figs. 4–5–6. In using my new instrument, moreover, different observers can repeat on each others' measurements to the high degree of accuracy which those curves typify.

Another very practical advantage of my invention is that it simplifies and lowers the cost of thickness measuring apparatus of the type under consideration. Electromagnetic gaging instruments of my unique design can be constructed at very moderate cost. When compared with the investment represented by comparable devices of the prior art this cost is so low as to make substantial savings possible.

At the same time desired precision of measurement is maintained, and the skill called for on the part of the operators is decreased. This results from the inherently simple construction of my measuring instrument and from the simplicity of technique in making observations. Mastery of this technique even by an inexperienced operator is found to require only a very short period of instruction and manipulation practice.

From the foregoing it will thus be seen that I have provided improved procedure and apparatus by which the thickness of nonmagnetic or weakly magnetic coatings on magnetic basis metals and of magnetic coatings on nonmagnetic basis materials may readily be determined; that I have increased the accuracy and reliability with which such measurements may be made; that I have simplified the procedure of the named measurement, reduced the time and skill required therefor, and increased the speed thereof; that I have simplified the construction, lowered the cost, and enhanced the portability of the apparatus needed thereby; and that I have provided an electromagnetic type of instrument which is energizable by either alternating or direct current and which is not adversely affected by variations in supply voltage.

My inventive improvements are therefore extensive in their adaption and are not to be restricted to the specific form here disclosed by way of illustration.

I claim:

1. For measuring the thickness of a coating carried by a basis material having magnetic characteristics which differ from those of the coating, the combination in a measuring instrument including a solenoid, a reference support for said solenoid permitting axial movement of the solenoid therealong, a magnetic core within said solenoid free to move axially with respect thereto, means for holding said solenoid with one end of said reference support and of said core in contact with the surface of the coating to be measured, means for energizing said solenoid whereby to magnetize said core and magnetically attract its said end against said coating's surface, means for moving said solenoid along said support away from said surface whereby to build up the solenoid's magnetic pull on said core until separation thereof from the surface is effected, and means for indicating the solenoid's spacing from said coating surface at the instant of said separation whereby to provide a measure of said coating's thickness.

2. In apparatus for measuring the thickness of nonmagnetic or weakly magnetic coatings on magnetic basis materials and/or of magnetic coatings on nonmagnetic basis materials, the combination of a solenoid positionable substantially vertically over the surface of the coating to be measured, a reference support for said solenoid contactable with said surface and permitting axial movement of the solenoid up or down along the support, a magnetic core within said solenoid free to move axially with respect thereto and also contactable with said surface when the solenoid is brought close to said coating, means for energizing said solenoid whereby to magnetize said core and by magnetically attracting same downwardly against the surface of said coating thereby requiring upward movement of the solenoid with attendant build up of upward magnetic pull on the core before separation of the core from said surface takes place, and means including said reference support for indicating said solenoid's spacing from said surface at the instant of said separation whereby to provide a measure of said coating's thickness.

3. In apparatus for measuring the thickness of a coating carried by a basis material having magnetic characteristics which differ from those of the coating, the combination of a solenoid having a central opening lengthwise therethrough, a nonmagnetic reference tube disposed within said opening and permitting the solenoid to be moved axially therealong, a magnetic core within said reference tube also free to move axially with respect thereto, means for holding said solenoid substantially vertically and with the lower end of said reference tube and of said core in contact with the surface of the coating to be measured, means for energizing said solenoid whereby to magnetize said core and magnetically attract its said lower end downwardly against the surface of said coating, means for moving said solenoid upwardly along said tube away from said surface whereby to build up the solenoid's upward magnetic pull on said core until separation thereof from the surface is effected, and means including said reference tube for indicating the solenoid's spacing from said surface at the instant of said separation whereby to provide a measure of said coating's thickness.

4. In apparatus for measuring the thickness of a coating carried by a basis material having magnetic characteristics which differ from those of the coating, the combination of a solenoid, a reference support for said solenoid permitting axial movement therealong, a scale carried by said reference support, a magnetic core within said solenoid free to move axially therethrough, means for holding said solenoid substantially vertically and with said core and the lower end of said reference support in contact with the surface of the coating to be measured, means for energizing said solenoid whereby to magnetize said core and magnetically attract the lower end thereof against said coating's surface, means for moving said solenoid upwardly along said reference support away from said surface whereby to build up the solenoid's upward magnetic pull on said core until separation of the core from the surface is effected, and means including said reference support's scale for showing the solenoid's spacing from said surface at the instant of said separation whereby to provide an indication of said coating's thickness.

5. In apparatus for measuring the thickness of a coating carried by a basis material having magnetic characteristics which differ from those of the coating, the combination of a solenoid, a reference support for said solenoid permitting axial movement therealong and carrying scale graduations, a magnetic core within said solenoid free to move axially with respect thereto, a nonmagnetic indicator extended from one end of said core and movable therewith through the solenoid, means for holding said solenoid substantially vertically and with the other end of said core and the lower end of said support in contact with the surface of the coating to be measured, means for energizing said solenoid whereby to magnetize said core and magnetically attract the lower end thereof downwardly against the surface of said coating, means for moving said solenoid upwardly along said support away from said surface whereby to build up the solenoid's upward magnetic pull on said core until separation thereof from the surface is effected, means effective at the instant of said separation to discontinue said movement and to hold the solenoid's position on said support, and means including said scale graduations and said indicator for showing the solenoid's spacing from said surface in said separation position whereby to provide an indication of said coating's thickness.

6. In apparatus for measuring the thickness of nonmagnetic or weakly magnetic coatings on magnetic basis materials and/or of magnetic coatings on nonmagnetic basis materials, the combination of a solenoid positionable substantially vertically over the surface of the coating to be measured, a scale carrying reference support for said solenoid contactable with said surface and permitting axial movement of the solenoid up or down along the support, a magnetic core within said solenoid free to move axially with respect thereto and contactable at its lower end with said surface when the solenoid is brought close to said coating, a nonmagnetic indicator extended from the upper end of said core and movable therewith through the solenoid, an electrical power source for energizing said solenoid whereby to magnetize said core and by magnetically attracting same downwardly against the surface of said coating thereby require upward movement of the solenoid with attendant build up of upward magnetic pull on the core before separation of the core from said surface takes place, and means including said reference scale for showing the elevation of said indicator along said support for the solenoid's position therealong at the instant of said core separation whereby to provide an indication of said coating's thickness which is substantially unaltered by variations in the voltage of said supply source.

7. In apparatus for measuring the thickness of a coating carried by a basis material having magnetic characteristics which differ from those of the coating, the combination of a solenoid, a reference support for said solenoid permitting axial movement therealong and carrying scale graduations, a magnetic core within said solenoid free to move axially with respect thereto, a nonmagnetic indicator extended from one end of said core and movable therewith through the solenoid, means for holding said solenoid substantially vertically and with the other end of said core and the lower end of said support in contact with the surface of the coating to be measured, an electrical supply source for energizing said solenoid whereby to magnetize said core and magnetically attract the lower end thereof downwardly against the surface of said coating, means for moving said solenoid upwardly along said support away from said surface whereby to build up the solenoid's upward magnetic pull on said core until separation thereof from the coating surface is effected, means effective at the instant of said separation to discontinue said movement and to hold the solenoid's position on said support, and means including said scale graduations for showing the elevation of said indicator along said support at said separation position of the solenoid whereby to provide an indication of said coating's thickness which is substantially unaltered by variations in the voltage of said supply source with their resultant changes in the solenoid's spacing from said surface at said core separation instant.

SAMUEL LIPSON.

REFERENCES CITED

The following references are of record in the file of this patent:

UNITED STATES PATENTS

| Number | Name | Date |
| --- | --- | --- |
| 1,187,833 | Heady | June 20, 1916 |
| 1,260,869 | Carlson | Mar. 26, 1918 |
| 1,335,647 | Bierbower | Mar. 30, 1920 |
| 2,219,282 | Harder | Oct. 29, 1940 |
| 2,318,666 | Bruce | May 12, 1943 |
| 2,360,121 | Garvin | Oct. 10, 1944 |